United States Patent
Yukino et al.

(10) Patent No.: US 6,787,067 B2
(45) Date of Patent: Sep. 7, 2004

(54) GRANULAR COMPOSITE ADDITIVE FOR POLYOLEFIN, PROCESS FOR PRODUCING THE SAME, AND POLYOLEFIN COMPOSITION CONTAINING THE SAME

(75) Inventors: Toshinori Yukino, Urawa (JP); Takashi Takeuchi, Urawa (JP); Naoko Tanji, Urawa (JP); Etsuo Tobita, Urawa (JP)

(73) Assignee: Asahi Denka Kogyo K.K., Tokyo (JP)

( * ) Notice: Subject to any disclaimer, the term of this patent is extended or adjusted under 35 U.S.C. 154(b) by 25 days.

(21) Appl. No.: 10/168,830

(22) PCT Filed: Nov. 1, 2001

(86) PCT No.: PCT/JP01/09596
§ 371 (c)(1),
(2), (4) Date: Aug. 16, 2002

(87) PCT Pub. No.: WO02/36677
PCT Pub. Date: May 10, 2002

(65) Prior Publication Data
US 2003/0125432 A1 Jul. 3, 2003

(30) Foreign Application Priority Data
Nov. 2, 2000 (JP) .......................... 2000-335707

(51) Int. Cl.$^7$ .................. C09K 15/08; C09K 15/02; C09K 15/32
(52) U.S. Cl. ................. 252/400.23; 252/404; 252/407; 252/182.29; 252/182.3; 252/182.35; 252/182.23; 524/141; 524/147; 524/287; 524/396
(58) Field of Search ................ 252/400.23, 400.24, 252/400.2, 404, 407, 182.14, 182.23, 182.29, 182.3, 182.31, 182.35; 524/141, 127, 147, 132, 287, 396, 394

(56) References Cited

U.S. PATENT DOCUMENTS

| | | | |
|---|---|---|---|
| 3,271,185 A | * | 9/1966 | Pollock ..................... 427/213 |
| 3,591,409 A | * | 7/1971 | Anbrey et al. ............... 428/407 |
| 3,637,634 A | | 1/1972 | Marinaccio et al. |
| 4,517,246 A | * | 5/1985 | Matsuyama et al. ......... 428/407 |
| 4,960,617 A | * | 10/1990 | Chatterjee et al. .......... 427/222 |
| 5,141,772 A | * | 8/1992 | Chatterjee .................... 427/213 |
| 5,300,539 A | | 4/1994 | Chatterjee |
| 5,874,505 A | * | 2/1999 | Saito et al. .................. 525/240 |
| 5,985,973 A | * | 11/1999 | Sumitomo et al. .......... 524/451 |
| 6,326,432 B1 | * | 12/2001 | Fujita et al. ................ 525/191 |
| 6,596,198 B1 | * | 7/2003 | Semen .................... 252/400.24 |
| 6,599,971 B2 | * | 7/2003 | Dotson et al. .............. 524/394 |
| 6,642,290 B1 | * | 11/2003 | Dotson ....................... 524/108 |

FOREIGN PATENT DOCUMENTS

| | | |
|---|---|---|
| DE | 28 26 360 | 12/1979 |
| EP | 0 471 463 A2 | 2/1992 |
| JP | 2-73837 | 3/1990 |
| JP | 7-278448 | 10/1995 |
| JP | 8-27323 | 1/1996 |
| JP | 2001-123021 | 5/2001 |

OTHER PUBLICATIONS

Patent Abstracts of Japan, vol. 1996, No. 5, May 31, 1996 & JP 08 003364, Jan. 9, 1996.

\* cited by examiner

*Primary Examiner*—Joseph D. Anthony
(74) *Attorney, Agent, or Firm*—Nixon & Vanderhye PC

(57) ABSTRACT

The present invention provides a multi-component granular additive for polyolefins which has a strength and a function which enable the additive to be dust-free and be of components-in-granule type. It comprises 10 parts by mass of a nucleating agent comprising an alkali metal salt or hydroxyaluminum salt of an aromatic monocarboxylylic acid or comprising an alkali metal salt or hydroxyaluminum salt of an acid aromatic phosphoric ester compound, 1 to 50 parts by mass of a phenolic antioxidant, 5 to 50 parts by mass of polyproylene, and 0 to 500 parts by mass of one or more optional additive components other than the nucleating agent and the phenolic antioxidant.

7 Claims, 2 Drawing Sheets point (1)

point (2)

point (3)

point (4)

point (5)

point (6)

point (7)

point (8)

GRANULAR COMPOSITE ADDITIVE FOR POLYOLEFIN, PROCESS FOR PRODUCING THE SAME, AND POLYOLEFIN COMPOSITION CONTAINING THE SAME

This application is the U.S. national phase of international application PCT/JP01/09596 filed Nov. 1, 2001 which designated the U.S.

TECHNICAL FIELD

The present invention relates to a multi-component granular additive for polyolefin, the additive containing a specific nucleating agent, a phenolic antioxidant, and polypropylene as essential components, and to a method for producing the additive. The invention also relates to a polyolefin composition containing the additive.

BACKGROUND ART

A variety of additives are incorporated into polyolefins, such as a stabilizer for imparting process stability against heat, oxidation, etc. during molding thereof and storage stability of the resultant molded products against light, heat, oxidation, etc.; a modifier for imparting strength, transparency, color, etc. to the molded products; and a catalyst deactivator.

Generally, these additives are used in powder form to polyolefins during molding thereof. However, use of these powdery additives produces airborne dust, which is problematic in terms of operational safety. In addition, a number of additives which differ in terms of specific weight and form must be uniformly mixed in arbitrary proportions, thereby raising problems in weighing and operation.

According to one proposed approach to solve these problems, a number of powdery additives are mixed in arbitrary proportions in advance, and the resultant mixture is shaped into granules. Through granulation, generation of airborne dust can be suppressed, and cumbersome work for formulating and uniformly mixing the additives can be mitigated, to thereby realize so-called dust-free, components-in-granule additives.

Recently, studies are focused on a granulation system employing a dry-compacting apparatus and a pellet mill, and a granulation method making use of a binder such as wax, paraffin, or steramide. However, the above granulation system is unsatisfactory, in that granules produced by means of the system have poor mechanical strength and are readily crushed to fine grains, thereby generating airborne dust, and that uniform mixing cannot be fully attained. In addition, use of a binder results in migration of unwanted compounds into polyolefin.

Japanese Patent Application Laid-Open (kokai) Nos. 5-179056, 6-91152, and 8-333477 disclose mixed granular additives and methods for producing the additives. Although these additives are almost satisfactory in terms of physical properties, functions thereof require improvements. Thus, there still remain problems in relation to integration of additives into granular form.

To crystalline polyolefins; e.g., α-polyolefins such as low-density polyethylene, linear-low-density polyethylene, high-density polyethylene, polypropylene, poly-1-butene, poly-3-methyl-1-butene, and ethylene/propylene block or random copolymers, an antioxidant is added in order to inhibit oxidation during molding and to prevent coloring and deterioration of physical properties. A nucleating agent must also be added to crystalline polyolefins in order to overcome drawbacks thereof; e.g., a slow crystallization rate after heat molding, progress of crystallization after molding, poor strength, and poor transparency. The nucleating agent must be dispersed uniformly in polyolefin resin so as to maximize the effect thereof. However, another problem is that, when the nucleating agent is granulated through the above-mentioned method, the resultant granules have impaired dispersibility, failing to fully attain the effect thereof.

In view of the foregoing, an object of the present invention is to provide a multi-component granular additive for polyolefin, the additive having a strength and functions suitable for serving as a dust-free, components-in-granule additive. Another object is to provide a composition containing polyolefin resin and the additive.

DISCLOSURE OF THE INVENTION

The present inventors have carried out extensive studies in order to solve the aforementioned problems, and have found that the aforementioned problems are effectively solved by a multi-component granular additive for polyolefin, the additive having specific compositional proportions. The present invention has been accomplished on the basis of this finding.

Accordingly, a first invention provides a multi-component granular additive for polyolefin, the additive comprising a nucleating agent that comprises an alkali metal salt or hydroxyaluminum salt of an aromatic monocarboxylic acid or comprises an alkali metal salt or hydroxyaluminum salt of an acid aromatic phosphoric ester compound, in an amount of 10 parts by mass; a phenolic antioxidant in an amount of 1–50 parts by mass; polypropylene in an amount of 5–50 parts by mass; and at least one additive component, serving as an optional component, other than the nucleating agent and the phenolic antioxidant in an amount of 0–500 parts by mass.

A second invention is drawn to a specific embodiment of a multi-component granular additive for polyolefin according to the first invention, wherein the nucleating agent is a compound represented by formula (I):

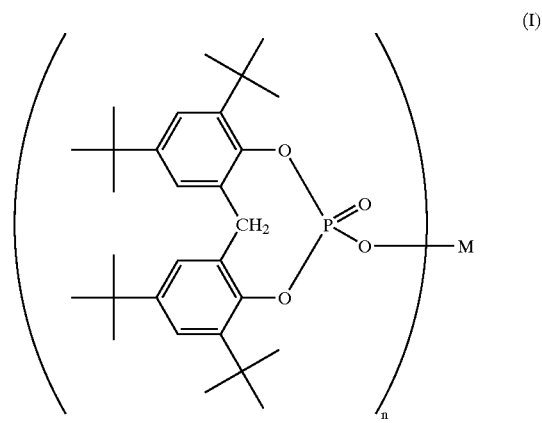

wherein n represents 1 or 2; when n is 1, M represents an alkali metal atom; and when n is 2, M represents hydroxyaluminum.

A third invention is drawn to a specific embodiment of a multi-component granular additive for polyolefin according to the first or second invention, wherein the phenolic antioxidant is tetrakis[3-(3,5-di-tert-butyl-4-hydroxyphenyl)propionyloxymethyl]methane.

A fourth invention is drawn to a specific embodiment of a multi-component granular additive for polyolefin according to any one of the first to third inventions, wherein said at least one additive component contains a phosphorus-containing antioxidant.

A fifth invention is drawn to a specific embodiment of a multi-component granular additive for polyolefin according to any one of the first to fourth inventions, wherein said at least one additive component contains an alkali metal salt or alkaline earth metal salt of an aliphatic monocarboxylic acid.

A sixth invention is drawn to a specific embodiment of a multi-component granular additive for polyolefin according to any one of the first to fifth inventions, wherein the granular additive has a ratio by mass (percent pulverization) of the particles which pass through a 16-mesh sieve of 1.0% or less as measured in a pulverization acceleration test by use of a shaking apparatus.

A seventh invention provides a method for producing a multi-component granular additive for polyolefin as recited in any one of the first to sixth inventions, characterized by comprising granulating a raw material comprising constitutional components at 150° C. to 270° C.

The present invention further provides a composition comprising polyolefin resin and the multi-component granular additive for polyolefin according to the first invention.

BEST MODES FOR CARRYING OUT THE INVENTION

Figure 1:
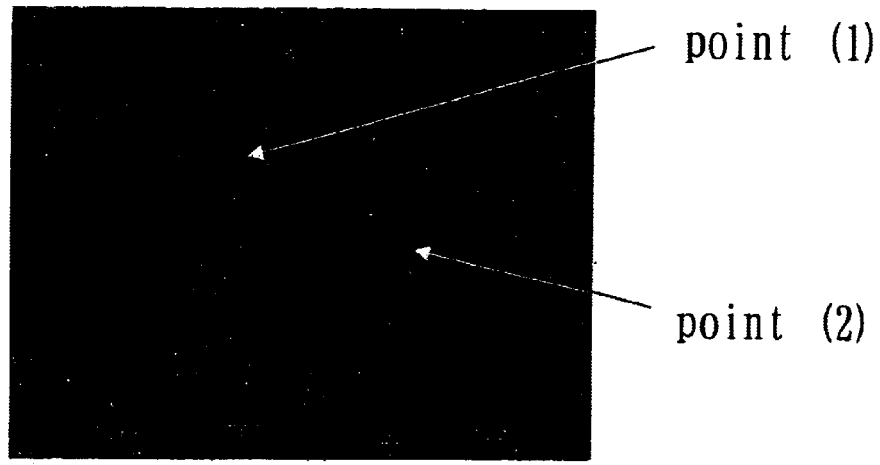
FIG. 1 is an electron microscope photograph of a broken face of Test Sample A, with points (1) and (2) indicating the sites at which composition analysis has been performed.

Modes for carrying out the invention will next be described.

The nucleating agent of the present invention comprises an alkali metal salt or hydroxyaluminum salt of an aromatic monocarboxylic acid or comprises an alkali metal salt or hydroxyaluminum salt of an acid aromatic phosphoric ester compound (hereinafter may be referred to simply as nucleating agent). Examples of preferred aromatic monocarboxylic acid metal salts which can serve as the nucleating agent include the compounds represented by the following formula:

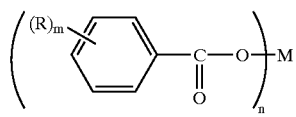

wherein R represents a C1–C8 alkyl group; m is an integer of 0 to 2; n represents 1 or 2; when n is 1, M represents an alkali metal atom; and when n is 2, M represents hydroxyaluminum.

Examples of the alkyl group represented by R in the above formula include methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, and 2-ethylhexyl. Examples of the alkali metal represented by M include lithium, sodium, and potassium.

Examples of the acid aromatic phosphoric ester compound metal salts which can serve as the above nucleating agent include compounds represented by the following formulas:

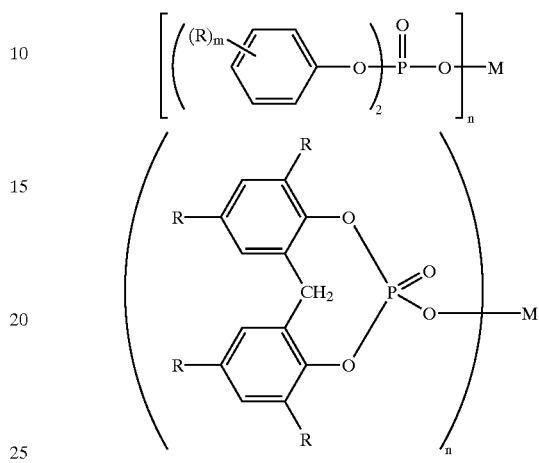

wherein each of Rs represents a C1–C8 alkyl group; m is an integer of 0 to 2; n represents 1 or 2; when n is 1, M represents an alkali metal atom; and when n is 2, M represents hydroxyaluminum.

Examples of Rs and Ms in the above formulas include those recited with respect to the above aromatic monocarboxylic acid metal salts.

Among these nucleating agents, compounds represented by formula (I):

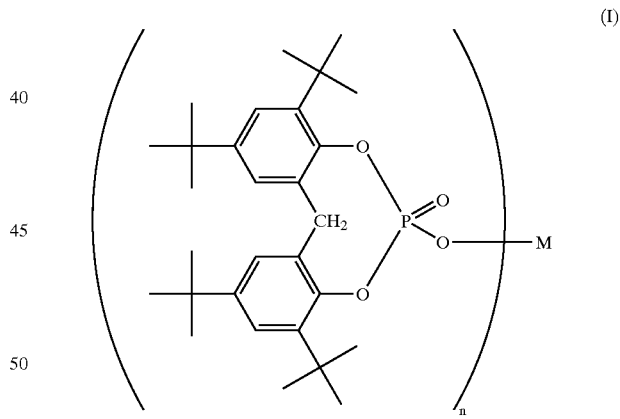

(I)

wherein n represents 1 or 2; when n is 1, M represents an alkali metal atom; and when n is 2, M represents hydroxyaluminum, are particularly preferred, since these compounds impart excellent transparency and strength to polyolefin.

Examples of the alkali metal represented by M in the above formula (I) include the above-recited elements.

The phenolic antioxidant of the present invention is a known antioxidant having a phenol skeleton in its molecule. Examples include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, tridecyl (3,5-di-tert-butyl-4-hydroxybenzyl)thioacetate, thiodiethylenebis[(3,5-di-tertbutyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid] glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[3-(3,5-di-tert-butyl-4-hydroxyphenyl)propionyloxymethyl]methane, which may also be called tetrakis[methylene-3-(3',5'-di-tert-butyl-4'-hydroxyphenyl)propionate]methane, 2-tert-butyl-4-methyl-6-(2-acroyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, and triethylene glycol bis[β-(3-tert-butyl-4-hydroxy-5-methylphenyl)propionate]. Of these, tetrakis[3-(3,5-di-tert-butyl-4-hydroxyphenyl)propionyloxymethyl]methane is particularly preferably used, since the compound has excellent and long-term antioxidation effect with respect to polyolefin.

As shown in electron microscope photographs of the below-described Examples and the compositional analysis results, the polypropylene of the present invention attains a uniform composition throughout an individual granule of the granular additive and exerts effect of excellently dispersing the granular additive in polyolefin. Thus, the polypropylene of the present invention excellently promotes the effects of the granular additive. No particular limitation is imposed on the form of the polypropylene, and powdery polypropylene is preferably employed, since the uniformity in composition throughout an individual granule of the granular additive is enhanced. Examples of the polypropylene include propylene homopolymer, random or block copolymers formed from C2–C10 α-olefin (other than propylene) and propylene (propylene content: 90 wt. % or more), and mixtures thereof. Melt index thereof is not particularly limited.

In the multi-component granular additive for polyolefin of the present invention, when the above-mentioned polypropylene is added in an amount less than 5 parts by mass based on 10 parts by mass of the nucleating agent, the aforementioned promotion effect cannot be attained, whereas when the amount of polypropylene is in excess of 50 parts by mass, enhancement of the effect commensurate with addition cannot be attained and the amounts of other additive components relatively decrease, impairing advantages in weighing, transportation, etc. Therefore, the amount of polypropylene is 5–50 parts by mass, preferably 10–20 parts by mass.

The "at least one additive component" contained in the multi-component additive for polyolefin of the present invention refers to a variety of inorganic and organic additives for use in polyolefin, other than the aforementioned nucleating agent and phenolic antioxidant. The species of the additive is not particularly limited, and the following additives may be employed.

Examples of phosphorus-containing antioxidants include triphenyl phosphite, tris(2,4-di-tert-butylphenyl)phosphite, tris(2,5-di-tert-butylphenyl)phosphite, tris(nonylphenyl) phosphite, tris(dinonylphenyl) phosphite, tris(mono-, dinonylphenyl)phosphite, diphenyl acid phosphite, 2,2'-methylenebis(4,6-di-tert-butylphenyl) octyl phosphite, diphenyl decyl phosphite, diphenyl octyl phosphite, di(nonylphenyl) pentaerythritol diphosphite, phenyl diisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol) 1,4-cyclohexanedimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl) pentaerythritol diphosphite, distearyl pentaerythritol diphosphite, tetra(C12–C15 mixed alkyl)-4,4'-isopropylidenediphenyl phosphite, bis[2,2'-methylenebis(4,6-diamylphenyl)]isopropylidenediphenyl phosphite, tetratridecyl 4,4'-butylidenebis(2-tert-butyl-5-methylphenol) diphosphite, hexa(tridecyl) 1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthren-10-oxide, and 2-butyl-2-ethylpropanediol 2,4,6-tri-tert-butylphenol monophosphite.

Examples of sulfur-containing antioxidants include dialkyl thiodipropionates such as dilauryl thiodipropionate, dimyristyl thiodipropionate, myristyl stearyl thiodipropionate, and distearyl thiodipropionate; and polyol β-alkylmercaptopropionic acid esters such as pentaerythritol tetra(β-dodecylmercaptopropionate).

Examples of hindered amine photostabilizers include compounds represented by the following formula (II); cyanuric-chloride-condensated products thereof; and high-molecular-weight species thereof:

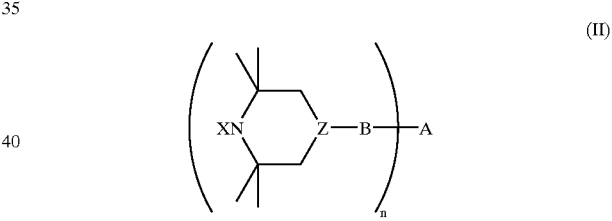

(II)

wherein n represents an integer of 1 to 6; A represents a hydrogen atom or a C1–C18 n-valent hydrocarbon group, n-valent acyl group, or n-valent carbamoyl group; B represents an oxygen atom, —NH—, or —NR'— having a C1–C8 alkyl group (R'); X represents a hydrogen atom, oxy radical (.O), a C1–C18 alkoxy group, a C1–C8 alkyl group, or a hydroxyl group; and Z represents a methine or a group having a C1–C8 alkyl group ($R^1$) and represented by the following formula (III).

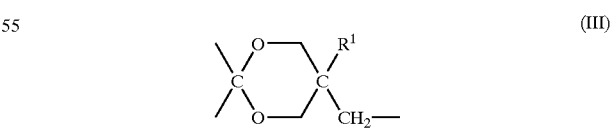

(III)

Examples of the C1–C18 n-valent hydrocarbon group represented by A in the above formula (II) include groups (alkyl to alkane(diyl to hexyl) groups) derived from methane, ethane, propane, butane, sec-butane, tert-butane, isobutane, pentane, isopentane, tert-pentane, hexane, cyclohexane, heptane, isoheptane, tert-heptane, n-octane, isooctane, tert-octane, 2-ethylhexane, nonane, isononane, decane, dodecane, tridecane, tetradecane, pentadecane, hexadecane, heptadecane, and octadecane.

The "n-valent acryl group" refers to a group derived from a carboxylic acid, an n-valent carboxylic acid, or a polyvalent carboxylic acid alkyl ester having n residual carboxylic groups. Examples of acyl derivative compounds include acetic acid, benzoic acid, 4-trifluoromethylbenzoic acid, salicylic acid, acrylic acid, methacrylic acid, oxalic acid, malonic acid, succinic acid, glutaric acid, adipic acid, pimelic acid, subelic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, dimer acid, phthalic acid, terephthalic acid, isophthalic acid, naphthalenedicarboxylic acid, cyclohexanedicarboxylic acid, trimellitic acid, trimesic acid, propane-1,2,3-tricarboxylic acid, (mono or di)-alkyl propane-1,2,3-tricarboxylate, pentane-1,3,5-tricarboxylic acid, (mono or di)-alkyl pentane-1,3,5-tricarboxylate, butane-1,2,3,4-tetracarboxylic acid, (mono to tri)-alkyl butane-1,2,3,4-tetracarboxylate, pentane-1,2,3,4,5-pentacarboxylic acid, (mono to tetra)-alkyl pentane-1,2,3,4,5-pentacarboxylate, hexane-1,2,3,4,5,6-hexacarboxylic acid, and (mono to penta)-alkyl hexane-1,2,3,4,5,6-hexacarboxylate. The "n-valent carbamoyl group" refers to a monoalkylcarbamoyl group or a dialkylcarbamoyl group derived from an isocyanate compound. Examples of isocyanate compounds which derive a monoalkylcarbamoyl group include tolylene diisocyanate, diphenylmethane-4,4'-diisocyanate, p-phenylene diisocyanate, xylylene diisocyanate, 1,5-naphthylene diisocyanate, 3,3'-dimethyldiphenyl-4,4'-diisocyanate, dianisidine diisocyanate, tetramethylxylylene diisocyanate, isophorone diisocyanate, dicyclohexylmethane-4,4'-diisocyanate, trans-1,4-cyclohexyl diisocyanate, norbornene diisocyanate, 1,6-hexamethylene diisocyanate, 2,2,4(2,2,4)-trimethylhexamethylene diisocyanate, lysine diisocyanate, triphenylmethane triisocyanate, 1-methylbenzole-2,4,6-triisocyanate, and dimethyltriphenylmethane tetraisocyanate. Examples of dialkylcarbamyol groups include diethylcarbamoyl, dibutylcarbamoyl, dihexylcarbamoyl, and dioctylcarbamoyl. These groups represented by A may be substituted by a halogen atom, a hydroxyl group, an alkyl group, an alkoxy group, a nitro group, a cyano group, etc.

Examples of the C1–C8 alkyl group (R') serving as B include methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, 1-ethylpentyl, n-octyl, isooctyl, tert-octyl, and 2-ethylhexyl. Examples of the C1–C18 alkoxy group represented by X include methoxy, ethoxy, propoxy, isopropoxy, butoxy, sec-butyloxy, tert-butyloxy, isobutyloxy, amyloxy, isoamyloxy, hexyloxy, heptyloxy, octyloxy, 2-ethylhexyloxy, nonyloxy, isononyloxy, decyloxy, dodecyloxy, tridecyloxy, tetradecyloxy, pentadecyloxy, hexadecyloxy, heptadecyloxy, and octadecyloxy. Examples of the C1–C8 alkyl group are the same as those exemplified for R' and examples of the C1–C8 alkyl group ($R^1$) in Z are also the same as those exemplified for R'.

Specific examples of the hindered amine photostabilizer represented by the above formula (II) include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)bis(tridecyl) 1,2,3,4-butanetetracarboxylate, bis(1,2,2,6,6-pentamethyl-4-piperidyl)bis(tridecyl) 1,2,3,4-butanetetracarboxylate, bis(1,2,2,6,6-pentamethyl-4-piperidyl)-2-butyl-2-(3,5-di-tert-butyl-4-hydroxybenzyl)malonate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, and 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane.

Examples of the cyanuric-chloride-condensated products of the hindered amine include 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetrazadodecane, 1,5,8,12-tetrakis[2,4-bis(N-butyl-N-(1,2,2,6,6-pentamethyl-4-piperidyl)amino)-s-triazin-6-yl]-1,5,8,12-tetrazadodecane, 1,6,11-tris[2,4-bis(N-butyl-N-(2,2,6,6-tetramethyl-4-piperidyl)amino)-s-triazin-6-ylamino]undecane, and 1,6,11-tris[2,4-bis(N-butyl-N-(1,2,2,6,6-pentamethyl-4-piperidyl)amino)-s-triazin-6-ylamino]undecane.

Examples of the high-molecular-weight species of the hindered amine include 1-(2-hydroxyethyl)-2,2,6,6-tetramethyl-4-piperidinol/diethyl succinate polycondensate and 1,6-bis(2,2,6,6-tetramethyl-4-piperidylamino)hexane/dibromoethane polycondensate.

Examples of UV-absorber-type photostabilizers include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), 2-(2-hydroxy-3-tert-butyl-5-carboxyphenyl)benzotriazole polyethylene glycol ester, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; 2-(2-hydroxyphenyl)-4,6-diaryl-1,3,5-triazines such as 2-[2-hydroxy-4-methoxyphenyl)-4,6-diphenyl-1,3,5-triazine, 2-[2-hydroxy-4-hexyloxyphenyl)-4,6-diphenyl-1,3,5- triazine, 2-[2-hydroxy-4-octoxyphenyl)-4,6-bis(2,4-dimethylphenyl)-1,3,5-triazine, 2-[2-hydroxy-4-(3-(C12–C13-mixed)-alkoxy-2-hydroxypropoxy)phenyl]-4,6-bis(2,4-dimethylphenyl)-1,3,5-triazine, 2-[2-hydroxy-4-(2-acryloyloxyethoxy)phenyl-4,6-bis(4-methylphenyl)-1,3,5-triazine, 2-(2,4-dihydroxy-3-allylphenyl)-4,6-bis(2,4-dimethylphenyl)-1,3,5-triazine, and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, hexadecyl-3,5-di-tert-butyl-4-hydroxybenzoate, and stearyl (3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and metal salts and metal chelates, inter alia nickel or chromium salts and chelates.

The alkali metal or alkaline earth metal salt of an aliphatic monocarboxylic acid is added to polyolefin resin and serves as a catalyst deactivator or a nucleating aid. Examples of the aliphatic monocarboxylic acid which provides the above salts include acetic acid, propionic acid, valeric acid, butyric acid, octylic acid, decanoic acid, lauric acid, myristic acid, palmitic acid, and stearic acid. Examples of the alkali metal which provides the above salts include lithium, sodium, and potassium. Examples of the alkaline earth metal which provides the above salts include magnesium, calcium, strontium, and barium.

Examples of additives other than those described above include an antistatic agent comprising a nonionic surfactant, a cationic surfactant, an anionic surfactant, an ampholytic surfactant, or a similar substance; a flame retardant such as a halogen-containing agent, a phosphorus-containing agent, or a metal oxide; a lubricant such as ethylenebis (alkylamide); a process aid; a filler; a colorant such as a dye or a pigment; dibenzylidene sorbitol; an organic carboxylic acid; hydrotalcite; talc; and silica.

Of these, a phosphorus-containing antioxidant is particularly preferred, since the antioxidant exerts a synergistic effect when used in combination with a phenolic antioxidant. The alkali metal or alkaline earth metal salt of an aliphatic monocarboxylic acid is preferably used, since the salt improves thermal stability of polyolefin and exerts a synergistic effect when used in combination with a nucleating agent.

The amounts of the additive components to be incorporated into the multi-component granular additive for polyolefin of the present invention are the same as the amounts of the additive components which would have been required if directly added to polyolefin, and such that excellent mechanical strength and performance are imparted to the multi-component granular additive for polyolefin.

The amount of the additive of the present invention to be added to polyolefin preferably falls within a range where effect of the additive begins to be manifested until the effect is no longer enhanced commensurate with further addition. Based on 100 parts by mass of polyolefin, the amount of the nucleating agent is 0.01–3 parts by mass, the amount of the phenolic antioxidant is 0.01–5 parts by mass, and the respective amounts of the additives other than the nucleating agent and the phenolic oxidant, the additives used in accordance with needs, are 0.001–15 parts by mass. Among the additives used in accordance with needs, the phosphorus-containing antioxidant, and the alkali metal or alkaline earth metal salt of an aliphatic monocarboxylic acid, which are included in examples of preferably employed additives, are each used in an amount of 0.001–5 parts by mass. Through the above formulation, a composition containing polyolefin resin and the multi-component granular additive for polyolefin of the present invention is provided.

The compositional proportions of the multi-component granular additive for polyolefin of the present invention are determined such that the multi-component granular additive exhibits sufficient mechanical strength and the additive exerts favorable effect in the above-described polyolefin. Specifically, based on 10 parts by mass of the nucleating agent, the phenolic antioxidant is used in an amount of 1–50 parts by mass, preferably 2–20 parts by mass. The additives other than the nucleating agent and the phenolic oxidant, the additives being used in accordance with needs, generally do not comprise 10 or more components. When the total amount of the additives increases, mechanical strength of granules decreases. Accordingly, the total amount of the additives is 0–500 parts by mass based on 10 parts by mass of the nucleating agent, preferably 100 parts by mass or less. Similar to the above case, the phosphorus-containing antioxidant and/or the alkali metal or alkaline earth metal salt of an aliphatic monocarboxylic acid are preferably used. When these additives are used, the total amount of the additives is preferably 1.0–100 parts by mass.

As described above, the nucleating agent is incorporated in the multi-component granular additive for polyolefin of the present invention in an amount of 1.64–62.5 mass %, preferably 3–60 mass %, more preferably 10–50 mass %, from the viewpoint of well-balanced strength and function of the produced granules.

No particular limitation is imposed on the form of particles of the multi-component granular additive for polyolefin of the present invention, and example forms include columnar, conical, prismatic, pyramidal, spherical, hemispherical, spheroidal, rugby-ball-like, egg-like, and cocoon-like. The mean particle size (sphere-equivalent) is preferably 1.2–10 mm, more preferably 1.5–5 mm.

The "percent pulverization" of the multi-component granular additive for polyolefin of the present invention as measured in a pulverization acceleration test is represented by a ratio by mass of the particles which pass through a 16-mesh sieve during shaking by means of a shaking apparatus to the entire particles. Since the particles which pass through a 16-mesh sieve mesh form airborne dust, which deteriorates operational safety, the percent pulverization is preferably 1.0% or less.

The method of the present invention for producing the aforementioned multi-component granular additive for polyolefin comprises mixing the above-described nucleating agent, phenolic antioxidant, polypropylene, and, in accordance with needs, optional additive components other than the nucleating agent and the phenolic oxidant; and granulating the resultant mixture at 150° C. to 270° C. When the granulation temperature is lower than 150° C., the produced granules have poor mechanical strength, thereby lowering the percent pulverization, whereas when the granulation temperature is higher than 270° C., fluidity increases, thereby rendering granulation difficult. No particular limitation is imposed on the molding method and apparatus for performing granulation and other factors, and any customary molding method and apparatus can be employed. Generally, a disk-pelleter method and an extrusion method are employed as a granular production method. Of these, the extrusion method is particularly preferred, since remarkably excellent strength is imparted to the produced granular additive.

No particular limitation is imposed on the type of polyolefin to which the multi-component granular additive of the present invention is added. Examples of the polyolefin include a-olefin polymers such as low-density polyethylene, linear-low-density polyethylene, high-density polyethylene, polypropylene, poly-1-butene, poly-3-methyl-1-butene, and propylene/ethylene block or random copolymers. Of these, polypropylene and ethylene/propylene block or random copolymers are particularly preferred, since excellently promoted effects of addition are ensured.

No particular limitation is imposed on the end uses of the above-described polyolefin, and examples include resin-made automobile parts such as bumpers, dashboards, and interior panels; resin parts of household electrical appliances such as refrigerators, washers, and vacuum cleaners; housewares such as tableware, buckets, and bath articles; general articles such as toys; and reservoirs and storage containers such as tanks. In addition to these molded products, example end uses include film products and fiber products of the polyolefin.

EXAMPLES

The present invention will next be described in more detail by way of Production Examples, Comparative Production Examples, Evaluation Examples, Examples, and Comparative Examples, which should not be construed as limiting the invention thereto.

Test Samples and Comparative Samples were prepared by use of a knead-extruder (model PCM 46, product of Ikegai) employing a die set (hole size: 2.5 mm, 16 holes), and a hot cut method. The produced pellets (multi-component granular additive) have a diameter of 2.5 mm and a length of 5–7 mm.

Production Example 1

Production of Test Sample A-1

Sodium 2,2'-methylenebis(4,6-di-tert-butylphenyl) phosphate (compound of formula 1; M=Na, n=1) serving as a nucleating agent (30 parts by mass); tetrakis[3-(3,5-di-tert-butyl-4-hydroxyphenyl)propionyloxymethyl]methane serving as a phenolic antioxidant (10 parts by mass); polypropylene powder (30 parts by mass); tris(2,4-di-tert-butylphenyl) phosphite serving as a phosphorus-containing antioxidant (10 parts by mass); and calcium stearate (alkali metal or alkaline earth metal salt of an aliphatic monocarboxylic acid) (10 parts by mass) were mixed, and the resultant mixture was extruded under predetermined conditions (cylinder temperatures: 80° C. (entry), 140° C. (middle), 165° C. (exit), screw rotation for extrusion: 60 rpm, and amount of extrusion: 17.0 kg/Hr), to thereby produce pellets.

Production Example 2

Production of Test Sample A-2

The procedure of Production Example 1 was repeated, except that extrusion conditions (cylinder temperatures: 80° C. (entry), 200° C. (middle), 165° C. (exit), screw rotation for extrusion: 60 rpm, and amount of extrusion: 17.4 kg/Hr) were employed instead of those of Production Example 1, to thereby produce pellets.

Production Example 3

Production of Test Sample A-3

The procedure of Production Example 1 was repeated, except that extrusion conditions (cylinder temperatures: 80° C. (entry), 250° C. (middle), 200° C. (exit), screw rotation for extrusion: 60 rpm, and amount of extrusion: 19.0 kg/Hr) were employed instead of those of Production Example 1, to thereby produce pellets.

Production Example 4

Production of Test Sample B

Sodium benzoate serving as a nucleating agent (30 parts by mass); tetrakis[3-(3,5-di-tert-butyl-4-hydroxyphenyl)propionyloxymethyl]methane serving as a phenolic antioxidant (10 parts by mass); polypropylene powder (30 parts by mass); tris(2,4-di-tert-butylphenyl)phosphite serving as a phosphorus-containing antioxidant (10 parts by mass); and calcium stearate (alkali metal or alkaline earth metal salt of an aliphatic monocarboxylic acid) (10 parts by mass) were mixed, and the resultant mixture was extruded under predetermined conditions (cylinder temperatures: 80° C. (entry), 140° C. (middle), 165° C. (exit), screw rotation for extrusion: 60 rpm, and amount of extrusion: 17.0 kg/Hr), to thereby produce pellets.

Production Example 5

Production of Test Sample C

Hydroxyaluminum 2,2'-methylenebis(4,6-di-tert-butylphenyl)phosphate serving as a nucleating agent (30 parts by mass); tetrakis[3-(3,5-di-tert-butyl-4-hydroxyphenyl)propionyloxymethyl]methane serving as a phenolic antioxidant (10 parts by mass); polypropylene powder (30 parts by mass); tris(2,4-di-tert-butylphenyl) phosphite serving as a phosphorus-containing antioxidant (10 parts by mass); glycerin monostearate serving as an antistatic agent (5 parts by mass); lithium myristate (alkali metal or alkaline earth metal salt of an aliphatic monocarboxylic acid) (15 parts by mass); and hydrotalcite DHT-4A (product of Kyowa Chemical Industry Co., Ltd.) (10 parts by mass) were mixed, and the resultant mixture was extruded under predetermined conditions (cylinder temperatures: 80° C. (entry), 140° C. (middle), 165° C. (exit), screw rotation for extrusion: 50 rpm, and amount of extrusion: 17.0 kg/Hr), to thereby produce pellets.

Production Example 6

Production of Test Sample D

Sodium 2,2'-methylenebis(4,6-di-tert-butylphenyl) phosphate serving as a nucleating agent (30 parts by mass); tetrakis[3-(3,5-di-tert-butyl-4-hydroxyphenyl)propionyloxymethyl]methane serving as a phenolic antioxidant (10 parts by mass); and polypropylene powder (30 parts by mass) were mixed, and the resultant mixture was extruded under predetermined conditions (cylinder temperatures: 80° C. (entry), 140° C. (middle), 165° C. (exit), screw rotation for extrusion: 60 rpm, and amount of extrusion: 17.0 kg/Hr), to thereby produce pellets.

Production Example 7

Production of Test Sample E

Sodium 2,2'-methylenebis(4,6-di-tert-butylphenyl) phosphate serving as a nucleating agent (20 parts by mass); tetrakis[3-(3,5-di-tert-butyl-4-hydroxyphenyl)propionyloxymethyl]methane serving as a phenolic antioxidant (20 parts by mass); polypropylene powder (20 parts by mass); tris(2,4-di-tert-butylphenyl)phosphite serving as a phosphorus-containing antioxidant (10 parts by mass); and calcium stearate (alkali metal or alkaline earth metal salt of an aliphatic monocarboxylic acid) (10 parts by mass) were mixed, and the resultant mixture was extruded under predetermined conditions (cylinder temperatures: 80° C.

(entry), 140° C. (middle), 165° C. (exit), screw rotation for extrusion: 60 rpm, and amount of extrusion: 17.0 kg/Hr), to thereby produce pellets.

Comparative Production Example 1

Production of Comparative Samples a, b, and c

The procedures of the aforementioned Production Examples 1, 4, and 5 were repeated, except that no polypropylene powder was incorporated into each formulation, to thereby produce Comparative Samples a, b, and c, respectively.

Comparative Production Example 2

Production of Comparative Sample 1

Tetrakis[3-(3,5-di-tert-butyl-4-hydroxyphenyl) propionyloxymethyl]methane serving as a phenolic antioxidant (10 parts by mass); polypropylene powder (30 parts by mass); tris(2,4-di-tert-butylphenyl)phosphite serving as a phosphorus-containing antioxidant (10 parts by mass); and calcium stearate (alkali metal or alkaline earth metal salt of an aliphatic monocarboxylic acid) (10 parts by mass) were mixed, and the resultant mixture was extruded under predetermined conditions (cylinder temperatures: 80° C. (entry), 140° C. (middle), 165° C. (exit), screw rotation for extrusion: 60 rpm, and amount of extrusion: 17.1 kg/Hr), to thereby produce pellets.

Evaluation Example 1

Figure 2:
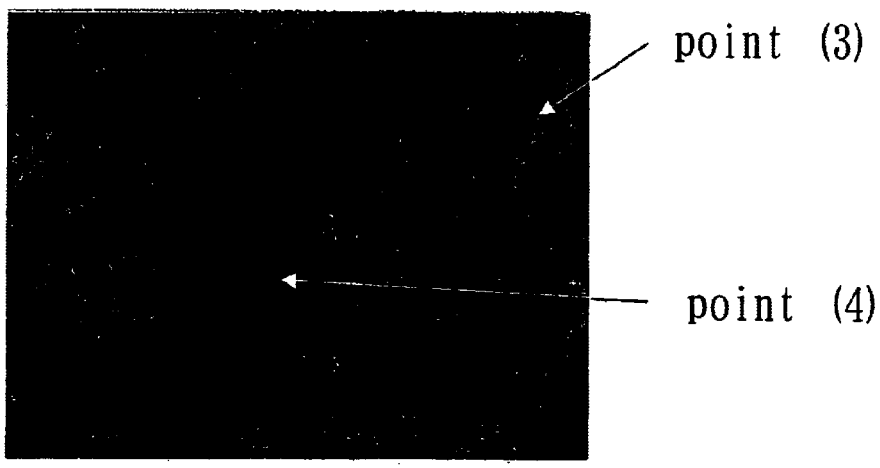
FIG. 2 is an electron microscope photograph of a broken face of Test Sample B, with points (3) and (4) indicating the sites at which composition analysis has been performed.
Figure 3:
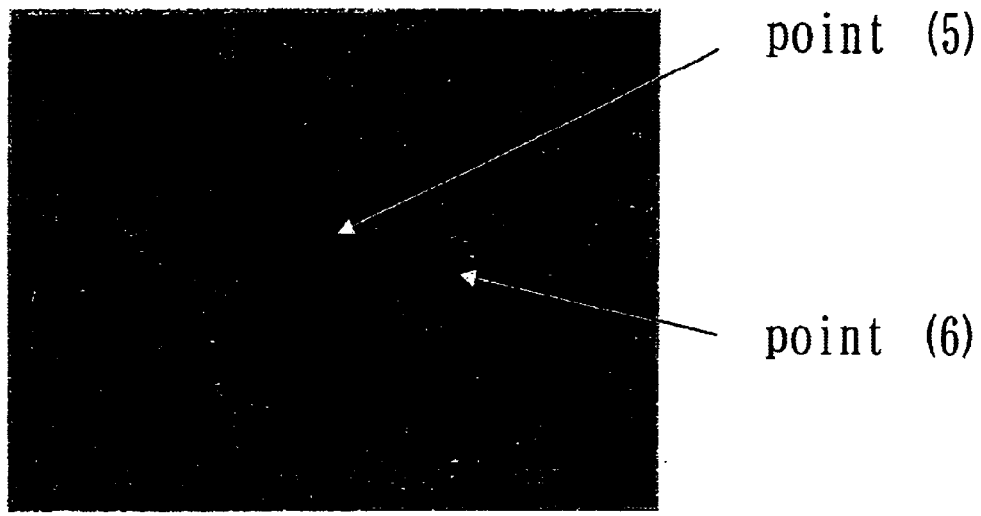
FIG. 3 is an electron microscope photograph of a broken face of Test Sample a, with points (5) and (6) indicating the sites at which composition analysis has been performed.
Figure 4:
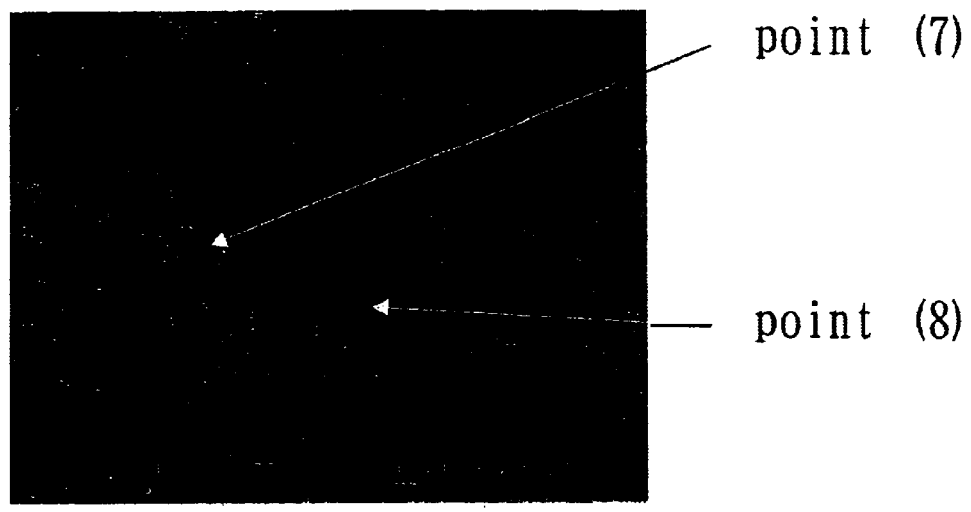
FIG. 4 is an electron microscope photograph of a broken face of Test Sample b, with points (7) and (8) indicating the sites at which composition analysis has been performed.

A broken surface of each of the thus-prepared Test Samples A-1 and B and Comparative Samples a and b was observed under an electron microscope and uniformity in composition was evaluated through EDS (energy dispersive spectroscopy) analysis and EELS (electron energy loss spectroscopy) analysis. Each of FIGS. 1 to 4 shows an electron microscope photograph of a broken surface of a test sample and sites at which compositional analysis has been performed. The results are shown in Table 1.

TABLE 1

|  |  |  | Detected Elements (count) |
|---|---|---|---|
| Test Sample A-1 | Point | (1) | Na(4,245), P(4,859), Ca(856) |
| " | Point | (2) | Na(4,377), P(5,130), Ca(922) |
| Test Sample B | Point | (3) | Na(12,944), P(4,475), Ca(836) |
| " | Point | (4) | Na(13,123), P(4,622), Ca(854) |
| Comp. Sample a | Point | (5) | Na(4,061), P(4,687), Ca(945) |
| " | Point | (6) | Na(1,785), P(5,397), Ca(240) |
| Comp. Sample b | Point | (7) | Na(15,435), P(4,745), Ca(811) |
| " | Point | (8) | Na(1,045), P(5,290), Ca(216) |

Table 1 confirms that incorporation of polypropylene into the multi-component granular additive for polyolefin of the present invention provides compositional uniformity in granules of the additive.

Evaluation Example 2

Evaluation of Strength (Percent Pulverization, Hardness)

Some representative Test Samples and Comparative Samples which have been produced in the above Production Examples were evaluated in terms of percent pulverization and strength (Kiya-type hardness-meter). The percent pulverization was measured in the following manner. Specifically, each sample (100 g) which had not passed through a 16-mesh sieve was placed in a plastic container (500 ml), and the sample was shaken for four hours at 300 cycles/minute (amplitude: 40 mm). The ratio by mass of particles which had passed through the 16-mesh sieve to the entire particles was obtained. The results are shown in Table 2.

TABLE 2

| Test Sample | Percent Pulverization (%) | Hardness (N) |
|---|---|---|
| Test Sample A-1 | 0.20 | 25.5 |
| Test Sample A-2 | 0.22 | 25.2 |
| Test Sample A-3 | 0.20 | 25.3 |
| Test Sample B | 0.24 | 25.0 |
| Test Sample C | 0.31 | 24.3 |
| Test Sample D | 0.20 | 26.1 |
| Test Sample E | 0.28 | 24.8 |
| Comparative Sample a | 3.52 | 10.0 |
| Comparative Sample b | 4.01 | 9.81 |
| Comparative Sample c | 3.76 | 9.84 |

Table 2 confirms that the multi-component granular additive for polyolefin of the present invention has excellent mechanical strength and can serve as a dust-free additive.

Evaluation Example 3

Each of the compositions shown in Tables 3 to 5 was mixed for five minutes by means of a Henschel mixer, and the resultant mixture was extruded at 250° C. and 25 rpm, to thereby prepare pellets. The pellets were injection-molded at 250° C., and the thus-produced test piece (thickness: 1 mm) was evaluated in terms of haze (JIS K7105) and flexural elasticity (ASTM D-747-63). Comparative Examples 1 to 3 contain additive components, shown in Table 3, for polypropylene, but the entire composition (formulation and components) of each mixture is substantially the same as that of the mixture of Example 1. Comparative Example 4 has a composition similar to that of Example 1, except that no nucleating agent is included. The entire composition (formulation and components) of each mixture of Comparative Examples 5 and 6 is substantially the same as that of the mixture of Example 3. The entire composition (formulation and components) of each mixture of Comparative Examples 7 and 8 is substantially the same as that of the mixture of Example 4.

TABLE 3

| No. | Composition (ratio by mass) | Haze (%) | Flexural elasticity (MPa) |
|---|---|---|---|
| Example 1 | Polypropylene (100) Test Sample A-1 (0.3) | 31.5 | 1,506 |
| Example 2 | Polypropylene (100) Test Sample D (0.3) | 31.3 | 1,504 |
| Comparative Example 1 | Polypropylene (100) Comparative Sample a (0.3) | 35.3 | 1,415 |
| Comparative Example 2 | Polypropylene Comparative Sample 1 Nucleating agent | 33.2 | 1,464 |
| Comparative Example 3 | Polypropylene Nucleating agent Phenolic antioxidant Phosphoric antioxidant Aliphatic monocarboxylic acid alkali metal or alkaline earth metal salt | 31.8 | 1,497 |
| Comparative Example 4 | Polypropylene Comparative Sample 1 | 66.1 | 1,092 |

TABLE 4

| No. | Composition (ratio by mass) | Haze (%) | Flexural elasticity (MPa) |
|---|---|---|---|
| Example 3 | Polypropylene (100) Test Sample B (0.9) | 56.3 | 1,364 |
| Comparative Example 5 | Polypropylene (100) Comparative Sample b (0.9) | 60.0 | 1,319 |
| Comparative Example 6 | Polypropylene Crystal nucleating agent Phenolic antioxidant Phosphoric antioxidant Aliphatic monocarboxylic acid alkali metal or alkaline earth metal salt | 56.4 | 1,362 |

TABLE 5

| No. | Composition (ratio by mass) | Haze (%) | Flexural elasticity MPa |
|---|---|---|---|
| Example 4 | Polypropylene (100) Test Sample C (0.5) | 17.4 | 1,416 |
| Comparative Example 7 | Polypropylene (100) Comparative Sample c (0.5) | 19.0 | 1,383 |
| Comparative Example 8 | Polypropylene Phenolic antioxidant Phosphoric antioxidant Aliphatic monocarboxylic acid alkali metal or alkaline earth metal salt | 17.4 | 1,414 |

Tables 3 to 5 confirm that when the multi-component granular additive of the present invention is added to polyolefin, excellent effect of addition, comparable to the cases of addition of non-integrated additive components, can be obtained. Furthermore, through integration of additive components in granular form, airborne dust can be suppressed, and cumbersome work for formulating and uniformly mixing the additives can be mitigated.

Industrial Applicability

The present invention provides a multi-component granular additive for polyolefin, the additive having a strength and a function suitable for serving as a dust-free, components-in-granule additive.

What is claimed is:

1. A multi-component granule additive for polyolefin, the additive comprising a nucleating agent that comprises an alkali metal salt or hydroxyaluminum salt of an aromatic monocarboxylic acid or comprises an alkali metal salt or hydroxyaluminum salt of an acid aromatic phosphoric ester compound, in an amount of 10 parts by mass; a phenolic antioxidant in an amount of 1–50 parts by mass; polypropylene in an amount of 5–50 parts by mass; and at least one additive component, serving as an optional component, other than the nucleating agent, the phenolic antioxidant, and the polypropylene component in an amount of 0–500 parts by mass, wherein the granule additive has a ratio by mass (percent pulverization) of the particles which pass through a 16-mesh sieve of 1.0% or less as measured in a pulverization acceleration test by use of a shaking apparatus.

2. A multi-component granule additive for polyolefin according to claim 1, wherein the nucleating agent is a compound represented by formula (I):

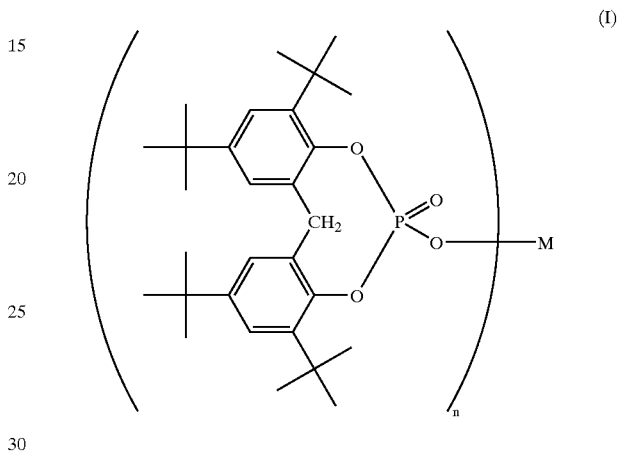

wherein n represents 1 or 2; when n is 1, M represents an alkali metal atom; and when n is 2, M represents hydroxyaluminum.

3. A multi-component granule additive for polyolefin according to claim 1, wherein the phenolic antioxidant is tetrakis[3-(3,5-di-tert-butyl-4-hydroxyphenyl) propionyloxymethyl]methane.

4. A multi-component granule additive for polyolefin according to claim 1, wherein said at least one additive component contains a phosphorus-containing antioxidant.

5. A multi-component granule additive for polyolefin according to claim 1, wherein said at least one additive component contains an alkali metal salt or alkaline earth metal salt of an aliphatic monocarboxylic acid.

6. A method for producing a multi-component granular additive for polyolefin as recited in any one of claims 1 to 5, said method comprising granulating a raw material comprising constitutional components at 150° C. to 270° C.

7. A composition comprising polyolefin resin and the multi-component granule additive for polyolefin as recited in any one of claims 1 to 5.

* * * * *